US012387185B1

(12) United States Patent
Singh et al.

(10) Patent No.: US 12,387,185 B1
(45) Date of Patent: Aug. 12, 2025

(54) LEVERAGING QUANTUM COMPUTING TO OPTIMIZE CASH RECYCLING

(71) Applicant: Bank of America Corporation, Charlotte, NC (US)

(72) Inventors: Shailendra Singh, Maharashtra (IN); Maneesh Kumar Sethia, Hyderabad (IN)

(73) Assignee: Bank of America Corporation, Charlotte, NC (US)

(*) Notice: Subject to any disclaimer, the term of this patent is extended or adjusted under 35 U.S.C. 154(b) by 23 days.

(21) Appl. No.: 18/423,525

(22) Filed: Jan. 26, 2024

(51) Int. Cl.
*G06Q 20/10* (2012.01)
*G07F 19/00* (2006.01)

(52) U.S. Cl.
CPC ....... *G06Q 20/1085* (2013.01); *G07F 19/209* (2013.01)

(58) Field of Classification Search
CPC .............. G06Q 20/1085; G07F 19/209
See application file for complete search history.

(56) References Cited

U.S. PATENT DOCUMENTS

| | | | |
|---|---|---|---|
| 8,827,151 B2 | 9/2014 | Agrawal | |
| 10,395,199 B1 | 8/2019 | Gibson et al. | |
| 11,080,668 B2 | 8/2021 | Ceribelli et al. | |
| 2018/0211190 A1* | 7/2018 | Guo | G06Q 10/08355 |
| 2021/0374697 A1* | 12/2021 | Chauhan | G06Q 20/1085 |

FOREIGN PATENT DOCUMENTS

| | | | | |
|---|---|---|---|---|
| CN | 102122405 A | * | 7/2011 | ............. G07D 11/00 |
| JP | 2022135244 A | * | 9/2022 | ............. G07D 11/24 |

OTHER PUBLICATIONS

Orhan et al.: Cash Replenishment and Vehivle Routing Improvement for Automated Teller Machines, 2023, , INFUS 2023, pp. 721-723. (Year: 2023)*
"Revolutionizing Retail, Hyosung Innovue is revolutionizing retial with our new series of ATMs: the Cajera Pivot and the Cajera Plus.", downloaded from <https://hyosunginnovue.com/retail-pivot-launch/?utm_source=ATMmarketplace&utm_medium=email&utm_campaign=Pivot-Launch> on Dec. 11, 2023.

* cited by examiner

*Primary Examiner* — Bijendra K Shrestha
(74) *Attorney, Agent, or Firm* — Banner & Witcoff, Ltd.

(57) ABSTRACT

Arrangements for leveraging quantum computing to optimize cash recycling at ATMs are provided. Current status data including location data, cash depletion rate data, and the like, may be received from a plurality of ATMs. Telemetry data from one or more cash replenishment vehicles may be received. The telemetry data may include GPS-based location data from a computing device associated with each vehicle, speed data, and the like. A machine learning model may be executed using the ATM status data and telemetry data as inputs to output an optimized replenishment scenario. In some examples, quantum computing may be used to analyze the data and identify the optimized replenishment scenario for execution. Executing the optimized replenishment scenario may include generating one or more instructions that causing one or more ATMs to activate or deactivate cash recycling functionality, causing one or more cash replenishment vehicles to modify a replenishment route, or the like.

11 Claims, 10 Drawing Sheets

Notice! 400

Based On Optimization Criteria, A
Replenishment Route For The Following
Vehicles Has Been Modified:

Vehicle 101

Vehicle 107

Click Here To View Modified Routes

Cancel    OK

FIG. 4

LEVERAGING QUANTUM COMPUTING TO OPTIMIZE CASH RECYCLING

BACKGROUND

Aspects of the disclosure relate to leveraging quantum computing to optimize cash recycling functions at self-service kiosks, such as automated teller machines (ATMs).

Conventional ATMs provide functionality that enables users to both deposit funds and withdraw funds. However, conventional ATMs do not typically recycle funds within a device. For instance, funds that are deposited to conventional ATMs are stored separately and isolated from funds used to satisfy withdrawal requests of users. Accordingly, replenishment of funds at an ATM must be provided by a replenishment service associated with the financial institution, a vendor, or the like, who refills storage compartments used to dispense funds for withdrawal. This arrangement can be inefficient and may lead to unavailability of funds if the replenishment service is delayed, if current information regarding replenishment needs is not available, or the like.

In some arrangements, ATMs may provide some cash recycling functionality that may enable transfer of funds that were deposited to the ATM to a storage area or compartment used to dispense funds to satisfy withdrawals. Accordingly, cash or funds may be "recycled" from a deposit function and associated storage to a withdrawal function and associated storage. While this functionality can aid in reducing a likelihood of unavailability of funds (e.g., by reusing bills and/or coins received, via deposit, by the ATM), it may be inefficient because of the lack of communication between the ATMs and replenishment vehicles or services, because of the unpredictable nature of the funds available from deposits, and the like. Accordingly, it would be advantageous to have an optimized scenario for initiating or executing cash recycling functions by an ATM, as well as for routing or scheduling replenishment services based on real-time data associated with the ATMs and the replenishment services.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with optimizing cash recycling functionality at ATMs.

In some examples, current status data may be received from a plurality of ATMs. The current status data may include location data, cash depletion rate data, and the like. In some arrangements, telemetry data from one or more cash replenishment vehicles may be received. The telemetry data may include global positioning system (GPS)-based location data from a computing device associated with each vehicle, as well as speed data, and the like.

In some examples, a machine learning model may be executed. The model may use the ATM status data and telemetry data as inputs to output an optimized replenishment scenario. In some examples, quantum computing may be used to analyze the data and identify the optimized replenishment scenario.

The optimized replenishment scenario may be executed. In some examples, executing the optimized replenishment scenario may include generating one or more instructions or commands that may cause one or more ATMs to activate or deactivate cash recycling functionality, may cause one or more cash replenishment vehicles to modify a replenishment route, or the like.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4 illustrates one example graphical user interface that may be generated in accordance with one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, conventional arrangements for operating ATMs, replenishing ATMs and the like, can be inefficient. The implementation of cash recycling functionality by an ATM may improve these inefficiencies but additional improvements may still be made by implementing an optimization process. For instance, by evaluating, using quantum computing, real-time data associated with a geo-location of each ATM, a current depletion rate of each ATM, and telemetry data associated with one or more replenishment vehicles (e.g., current geo-location, speed data, and the like), an optimized replenishment scenario may be identified and executed. The optimized replenishment scenario may include transmitting one or more commands to one or more ATMs to initiate cash recycling functions, continue cash recycling functions, deactivate cash recycling functions, or the like. The optimized replenishment scenario may further include transmitting one or more commands to one or more replenishment vehicles causing a vehicle to execute or modify a current replenishment route (e.g., route for replenishing ATMs) to implement the optimized scenario.

These and various other arrangements will be discussed more fully below.

Figure 1A:
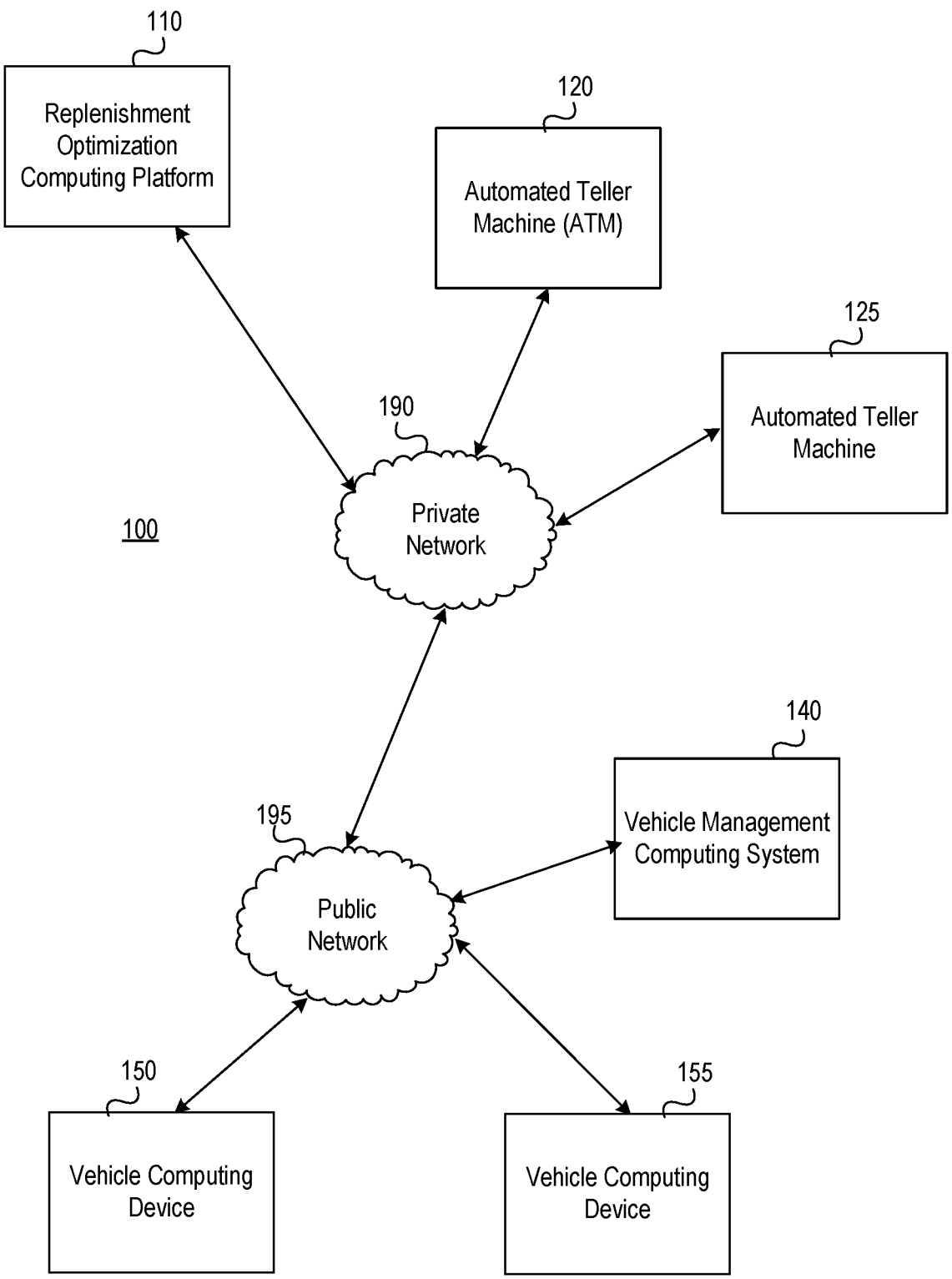
FIGS. 1A-1B depict an illustrative computing environment for leveraging quantum computing to optimize cash recycling functions at ATMs in accordance with one or more aspects described herein.
Figure 1B:
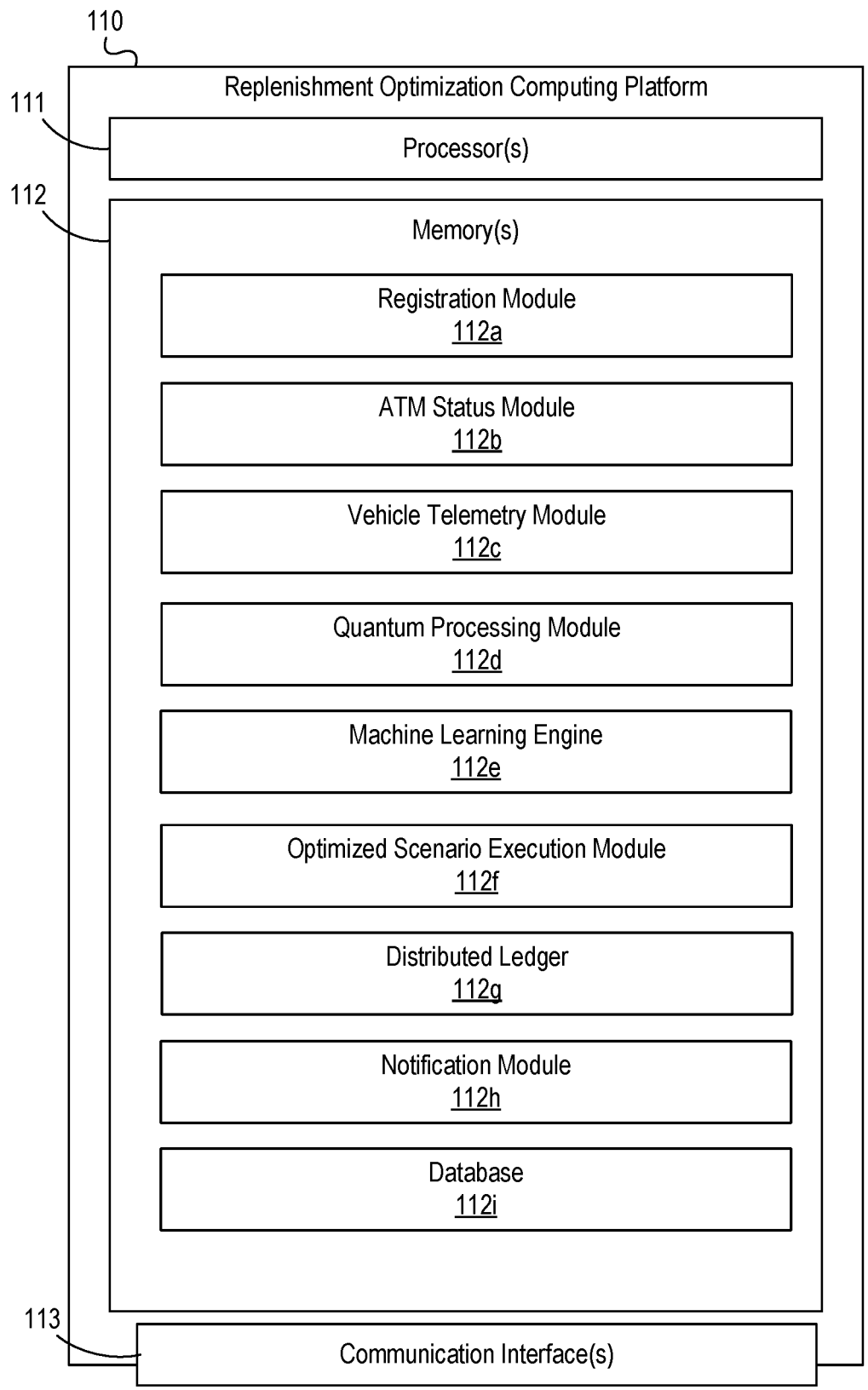

FIGS. 1A-1B depict an illustrative computing environment for implementing processes leveraging quantum computing to optimize cash recycling at ATMs in accordance with one or more aspects described herein. Referring to FIG. 1A, computing environment 100 may include one or more computing devices and/or other computing systems. For example, computing environment 100 may include replenishment optimization computing platform 110, ATM 120, ATM 125, vehicle management computing system 140, vehicle computing device 150 and/or vehicle computing device 155. Although two ATMs, one vehicle management computing system 140 and two vehicle computing devices 150, 155 are shown, any number of systems or devices may be used without departing from the invention.

Replenishment optimization computing platform 110 may be or include one or more computing devices (e.g., servers, server blades, or the like) and/or one or more computing components (e.g., memory, processor, and the like) and may be configured to provide dynamic, efficient, intelligent cash recycling optimization determinations. For instance, replenishment optimization computing platform 110 may receive, from a plurality of ATMs, real-time status data associated with each ATM. For instance, geo-location data of each ATM, depletion rate of cash in each ATM, and the like, may be received.

Replenishment optimization computing platform 110 may further receive current telemetry data from one or more replenishment vehicles. For instance, vehicles may travel from ATM to ATM (e.g., along a predetermined route) to replenish cash or funds in each ATM. Telemetry data associated with current geo-location of each vehicle, speed of each vehicle, or the like, may be received and used to determine or modify a replenishment route.

Replenishment optimization computing platform 110 may process the received ATM status data and telemetry data to determine an optimized replenishment scenario. For instance, given the volume of data being process, and the speed at which the data must be processed in order to be useful in determining an optimized replenishment scenario, quantum computing may be used to evaluate the data. In some examples, photonic quantum computing hardware may be used. Photonic quantum computing may be a photon-based system that does not require environmental controls similar to other types of quantum computing and, accordingly, is more accessible.

The quantum computing may output an optimized replenishment scenario based on the current ATM status data and telemetry data from the one or more vehicles and replenishment optimization computing platform 110 may execute the optimized replenishment scenario. For instance, replenishment optimization computing platform 110 may transmit one or more instructions or commands to one or more ATMs to initiate cash recycling functions, modify or maintain current cash recycling functions, deactivate cash recycling functions, or the like, based on the identified optimized replenishment scenario. Further, replenishment optimization computing platform 110 may transmit one or more instructions to one or more replenishment vehicles to execute or modify an ATM replenishment route. Accordingly, an optimized scenario may be identified in real-time or near real-time, based on real-time or near real-time data, and may be executed quickly to ensure the most efficient scenario is executed.

ATM 120 and/or ATM 125 may be or include one or more computing devices (e.g., servers, server blades, or the like) and/or one or more computing components (e.g., memory, processor, and the like. ATM 120 and/or ATM 125 may provide various types of functionality to users of the ATM, such as deposits, withdrawals, balance transfers, balance inquiries, and the like. As discussed herein, ATM 120 and/or ATM 125 may be configured to enable or disable cash recycling functions in which funds (e.g., bills and/or coins) received as a deposit to the ATM can be "recycled" and dispensed to another user to satisfy a withdrawal request from the other user. Accordingly, ATM 120 and/or ATM 125 may be configured to move funds between storage locations designated to store deposited funds and storage locations designated to store funds to be dispensed in response to withdrawal requests.

Vehicle management computing system 140 may be or include one or more computing devices (e.g., servers, server blades, or the like) and/or one or more computing components (e.g., memory, processor, and the like, and may be associated with an ATM replenishment service (e.g., operated by a financial institution, vendor, or other organization or entity). Vehicle management computing system 140 may, in some examples, identify an initial replenishment route for one or more replenishment vehicles and may transit each respective route to a replenishment vehicle device, such as vehicle computing device 150, vehicle computing device 155, or the like.

Vehicle computing device 150 and/or vehicle computing device 155 may be or include one or more computing devices, such as laptop computers, tablet computers, smart phones, wearable devices, and the like. Each of vehicle computing device 150 and vehicle computing device 155 may be associated with a different replenishment vehicle and may execute different replenishment routes as designated by vehicle management computing system 140, replenishment optimization computing platform 110, or the like.

As mentioned above, computing environment 100 also may include one or more networks, which may interconnect one or more of replenishment optimization computing platform 110, ATM 120, ATM 125, vehicle management computing system 140, vehicle computing device 150 and/or vehicle computing device 155. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, replenishment optimization computing platform 110, ATM 120, ATM 125, may be associated with an enterprise organization (e.g., a financial institution), and private network 190 may be associated with and/or operated by the organization, and may include one or more networks (e.g., LANs, WANs, virtual private networks (VPNs), or the like) that interconnect replenishment optimization computing platform 110, ATM 120, ATM 125, and one or more other computing devices and/or computer systems that are used by, operated by, and/or otherwise associated with the organization. Public network 195 may connect private network 190 and/or one or more computing devices connected thereto (e.g., replenishment optimization computing platform 110, ATM 120, ATM 125) with one or more networks and/or computing devices that are not associated with the organization. For example, vehicle management computing system 140, vehicle computing device 150, vehicle computing device 155, might not be associated with an organization that operates private network 190 (e.g., because vehicle management computing system 140, vehicle computing device 150, and/or vehicle computing device 155 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect vehicle management computing system 140, vehicle computing device 150, and/or vehicle computing device 155 to private network 190 and/or one or more computing devices connected thereto (e.g., replenishment optimization computing platform 110, ATM 120, and/or ATM 125).

Referring to FIG. 1B, replenishment optimization computing platform 110 may include one or more processors 111, memory 112, and communication interface 113. A data bus may interconnect processor(s) 111, memory 112, and communication interface 113. Communication interface 113 may be a network interface configured to support communication between replenishment optimization computing platform 110 and one or more networks (e.g., network 190, network 195, or the like). Memory 112 may include one or more program modules having instructions that when executed by processor(s) 111 cause replenishment optimization computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of replenishment optimization computing platform 110 and/or by different computing devices that may form and/or otherwise make up replenishment optimization computing platform 110.

For example, memory 112 may have, store and/or include registration module 112a. Registration module 112a may store instructions and/or data that may cause or enable the replenishment optimization computing platform 110 to receive registration data from an enterprise organization associated with a plurality of ATMs, as well as a vehicle management entity which may be part of the enterprise organization or a separate entity. In some examples, the registration data may include identification of a plurality of ATMs (e.g., based on unique identifier, or the like), geo-location data of each ATM of the plurality of ATMs (e.g., based on global positioning system or other data), identification of a plurality of vehicles operated by the vehicle management system to replenish the ATMs (e.g., based on unique identifier or the like), and the like. The registration data may further enable communication between the replenishment optimization computing platform 110 and the plurality of ATMs (e.g., ATM 120, ATM 125, or the like), and/or the vehicle management computing system 140 and vehicle computing devices, such as vehicle computing device 150, vehicle computing device 155, or the like, to receive current status information of each ATM, depletion rate, telemetry data associated with each vehicle, and the like.

Replenishment optimization computing platform 110 may further have, store and/or include ATM status module 112b. ATM status module 112b may store instructions and/or data that may cause or enable the replenishment optimization computing platform 110 to receive current (e.g., real-time or near real-time) status data associated with each ATM. The current status data may include a location of each ATM, identifier of each ATM, current depletion rate associated with each ATM, and the like.

Replenishment optimization computing platform 110 may further have, store and/or include vehicle telemetry module 112c. Vehicle telemetry module 112c may store instructions and/or data that may cause or enable the replenishment optimization computing platform to receive, from computing devices associated with a plurality of replenishment vehicles (e.g., vehicle computing device 150, vehicle computing device 155, and the like) and, in some examples, vehicle management computing system 140 current or expected route data, telemetry data including geo-location data based on, for instance, a global positioning system associated with each computing device, speed of each vehicle, and the like (e.g., real-time or near real-time data).

Replenishment optimization computing platform 110 may further have, store and/or include quantum processing module 112d. Quantum processing module 112d may store instructions and/or data that may cause or enable replenishment optimization computing platform 110 to process, using photon-based quantum computing, the received ATM status data and vehicle telemetry data to identify an optimized replenishment scenario for execution. For instance, quantum processing module 112d may function in conjunction with machine learning engine 112e to input, to a machine learning model, the ATM status data and vehicle telemetry data, to output an optimized replenishment scenario.

In some examples, the machine learning model may be trained using historical data related to replenishment routes, depletion rates, location data, speed data, and the like, associated with historical replenishment of one or more ATMs. In some examples, the machine learning model may be trained using a plurality of scenarios (e.g., a plurality of routes, a plurality of depletion rates, a plurality of potential or historical telemetry data for vehicles, and the like) to identify patterns or sequences in the data that enables the machine learning model to output an optimized replenishment scenario (e.g., modified replenishment route(s), enabling or disabling cash recycling at one or more ATMs, and the like.

In some examples, the machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models. In some examples, training the machine learning model may include training the model using labeled data (e.g., labeled data different scenarios, replenishment rates, telemetry data, and the like) and/or unlabeled data.

Accordingly, the machine learning model may be executed using quantum computing techniques to identify, in real-time, an optimized replenishment scenario for a plurality of ATMs, a subset of the plurality of ATMs, or the like, which may then be executed by the ATMs and/or one or more replenishment vehicles.

Replenishment optimization computing platform 110 may further have, store and/or include optimized scenario execution module 112f. Optimized scenario execution module 112f may store instructions and/or data that cause or enable the replenishment optimization computing platform 110 to receive, from the machine learning model, an optimized scenario for execution and execute the optimized scenario. For instance, in executing the optimized scenario, optimized scenario execution module 112*f* may generate one or more instructions or commands, to one or more ATMs, vehicle computing devices, or the like, that, when transmitted may cause the ATMs to enable or disable cash recycling functionality, may modify a replenishment route for one or more vehicles, or the like.

Replenishment optimization computing platform 110 may further have, store and/or include distributed ledger 112*g*. Distributed ledger 112*g* may store instructions and/or data that may cause or enable the replenishment optimization computing platform to generate and/or modify a distributed ledger (e.g., blockchain) to track steps performed in executing the optimized scenario. For instance, in order to accurately trace funds associated with replenishment, each action taken based on the optimized scenario may be stored in the distributed ledger (e.g., a block may be added to the distributed ledger identifying the action taken, devices impacted, amounts, and/or the like). In some examples, distributed hash technology may be used to orchestrate the cash flow and ensure traceability.

Replenishment optimization computing platform 110 may further have, store and/or include notification module 112*h*. Notification module 112*h* may store instructions and/or data that may cause or enable the replenishment optimization computing platform 110 to generate and transmit one or more notifications. For instance, based on an identified optimized replenishment scenario, a notification may be transmitted to administrator(s) associated with ATMs impacted to notify them of changes (e.g., enabling or disabling cash recycling, or the like). Similarly, a notification may be generated and transmitted to impacted vehicle computing devices indicating that a route has been modified. Various other notifications may be generated and transmitted without departing from the invention.

Replenishment optimization computing platform 110 may further have, store and/or include database 112*i*. Database 112*i* may store data related to ATM and/or vehicle registration, identified optimized scenarios, notifications generated and/or other data that enables performance of aspects described herein by the replenishment optimization computing platform 110.

FIGS. 2A-2E depict one example illustrative event sequence for leveraging quantum computing to optimize cash recycling in ATMs in accordance with one or more aspects described herein. The events shown in the illustrative event sequence are merely one example sequence and additional events may be added, or events may be omitted, without departing from the invention. Further, one or more processes discussed with respect to FIGS. 2A-2E may be performed in real-time or near real-time.

Figure 2A:
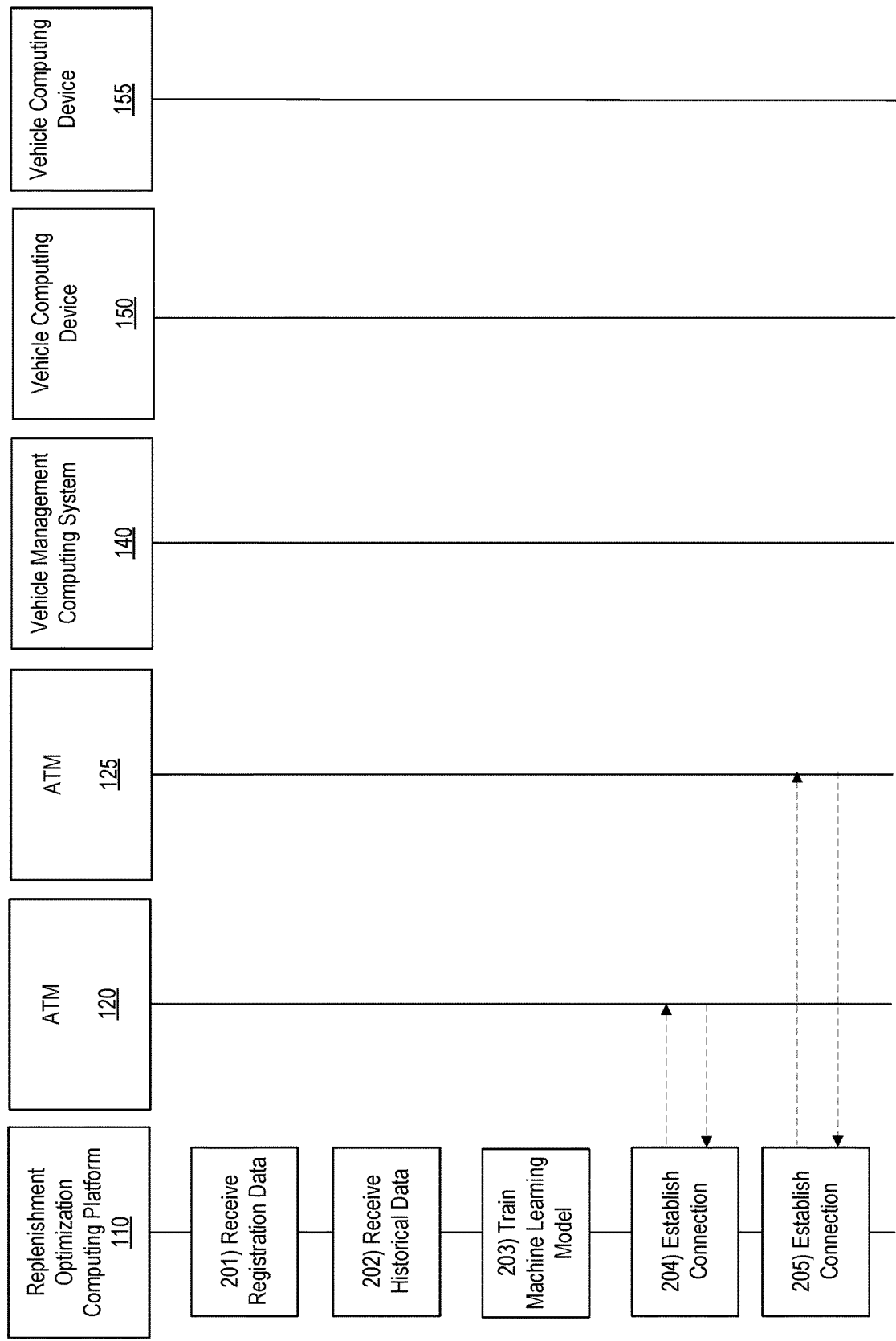
FIGS. 2A-2E depict an illustrative event sequence for leveraging quantum computing to optimize cash recycling functions at ATMs in accordance with one or more aspects described herein.

With reference to FIG. 2A, at step 201, replenishment optimization computing platform 110 may receive registration data. For instance, replenishment optimization computing platform 110 may receive registration data from one or more ATMs, one or more vehicle management computing systems, one or more vehicle computing devices, and the like. In some examples, the registration data may include device identifiers, geo-location information associated with an ATM or replenishment vehicle, operational capabilities of an ATM (e.g., whether cash recycling functions can be performed), and the like.

At step 202, replenishment optimization computing platform 110 may receive historical data. For instance, replenishment optimization computing platform 110 may receive historical data related to depletion rates at one or more ATMs, replenishment routes of vehicles, frequency of replenishment, and the like. In some examples, a plurality of replenishment scenarios may be generated including different combinations of depletion rates, ATM locations, vehicle speeds, and the like.

At step 203, replenishment optimization computing platform 110 may train a machine learning model. For instance, replenishment optimization computing platform 110 may train a machine learning model to receive, as inputs, current ATM status information (e.g., location, depletion rate, cash deposit rate, and the like), as well as vehicle route and telemetry data (e.g., speed, geo-location, and the like) to output an optimized replenishment scenario. In some examples, the machine learning model may be trained using labeled or unlabeled data that may include the historical data received at step 202, various replenishment scenarios generated, and the like. In some examples, the machine learning model may be trained using quantum computing techniques (e.g., photon-based quantum computing) to efficiently process the vast amounts of data used to train the model (e.g., status data, replenishment data, capability data and/or the plurality of scenarios generating using various combinations of depletion data, telemetry data, location data, and the like).

At step 204, replenishment optimization computing platform 110 may establish a connection with ATM 120. For instance, replenishment optimization computing platform 110 may establish a first wireless connection with ATM 120, which may be a registered ATM. Upon establishing the first wireless connection, a communication session may be initiated between replenishment optimization computing platform 110 and ATM 120.

At step 205, replenishment optimization computing platform 110 may establish a connection with ATM 125. For instance, replenishment optimization computing platform 110 may establish a second wireless connection with ATM 125, which may be a registered ATM. Upon establishing the second wireless connection, a communication session may be initiated between replenishment optimization computing platform 110 and ATM 125.

Figure 2B:
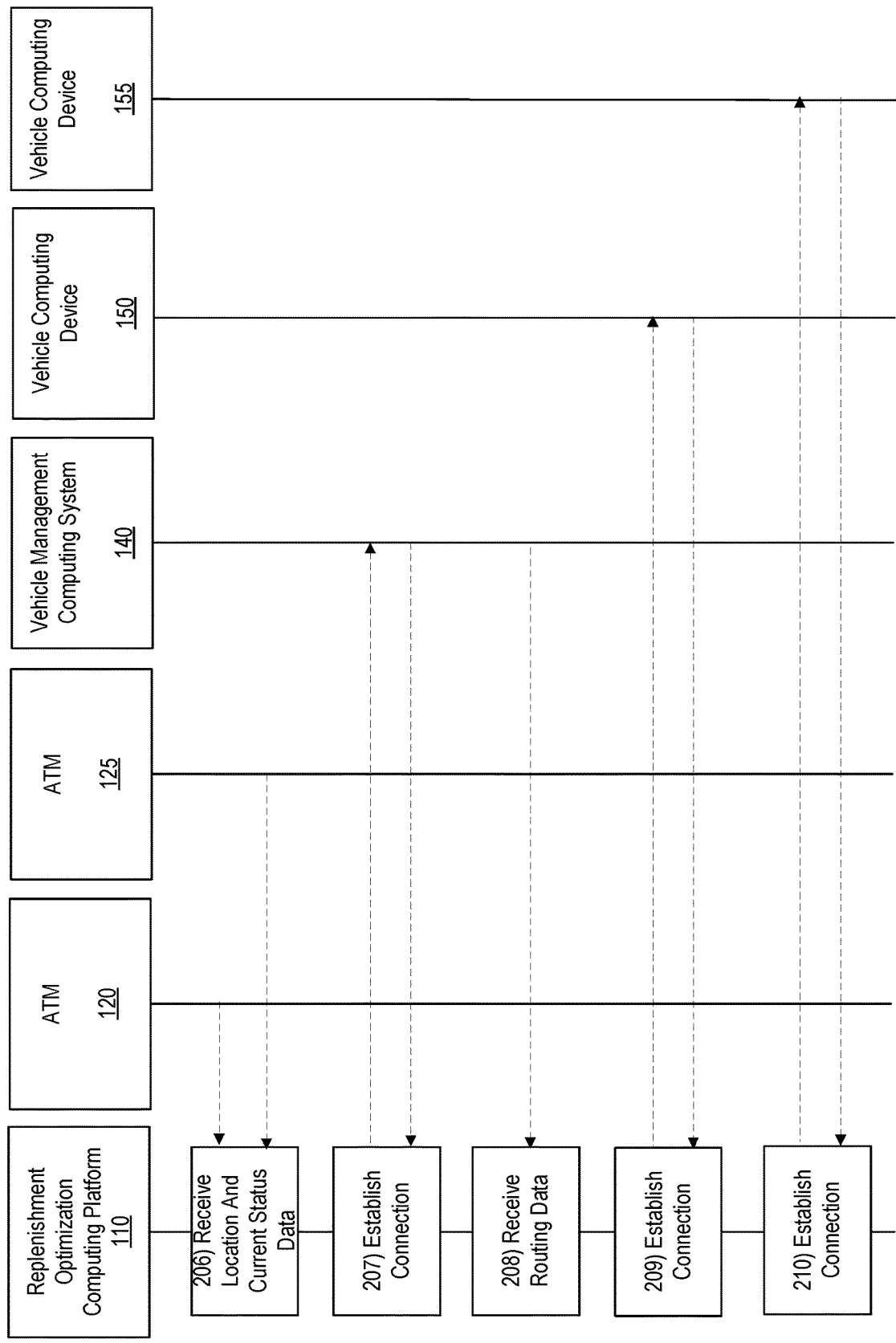

With reference to FIG. 2B, at step 206, replenishment optimization computing platform 110 may receive status information from ATM 120 and/or ATM 125. For instance, a location of each ATM (e.g., geo-location coordinates), a current cash depletion rate, a current cash deposit rate, and the like, may be received from ATM 120 and/or ATM 125. The status information may be received during the communication sessions initiated upon establishing the first and second connections. Although two ATMs are shown, more or fewer ATMs may be used without departing from the invention.

At step 207, replenishment optimization computing platform 110 may establish a connection with vehicle management computing system 140. For instance, replenishment optimization computing platform 110 may establish a third wireless connection with vehicle management computing system 140. Upon establishing the third wireless connection, a communication session may be initiated between replenishment optimization computing platform 110 and vehicle management computing system 140.

At step 208, replenishment optimization computing platform 110 may receive replenishment routing data from the vehicle management computing system 140. For instance, current replenishment routes associated with registered ATMs (e.g., ATM 120, ATM 125, and the like) may be received from the vehicle management computing system 140. The routing information may be received during the communication session initiated upon establishing the third wireless connection.

At step 209, replenishment optimization computing platform 110 may establish a connection with vehicle computing device 150. For instance, replenishment optimization computing platform 110 may establish a fourth wireless connection with vehicle computing device 150, which may be a registered vehicle computing device. Upon establishing the fourth wireless connection, a communication session may be initiated between replenishment optimization computing platform 110 and vehicle computing device 150.

At step 210, replenishment optimization computing platform 110 may establish a connection with vehicle computing device 155. For instance, replenishment optimization computing platform 110 may establish a fifth wireless connection with vehicle computing device 155, which may be a registered vehicle computing device. Upon establishing the fifth wireless connection, a communication session may be initiated between replenishment optimization computing platform 110 and vehicle computing device 155.

Figure 2C:
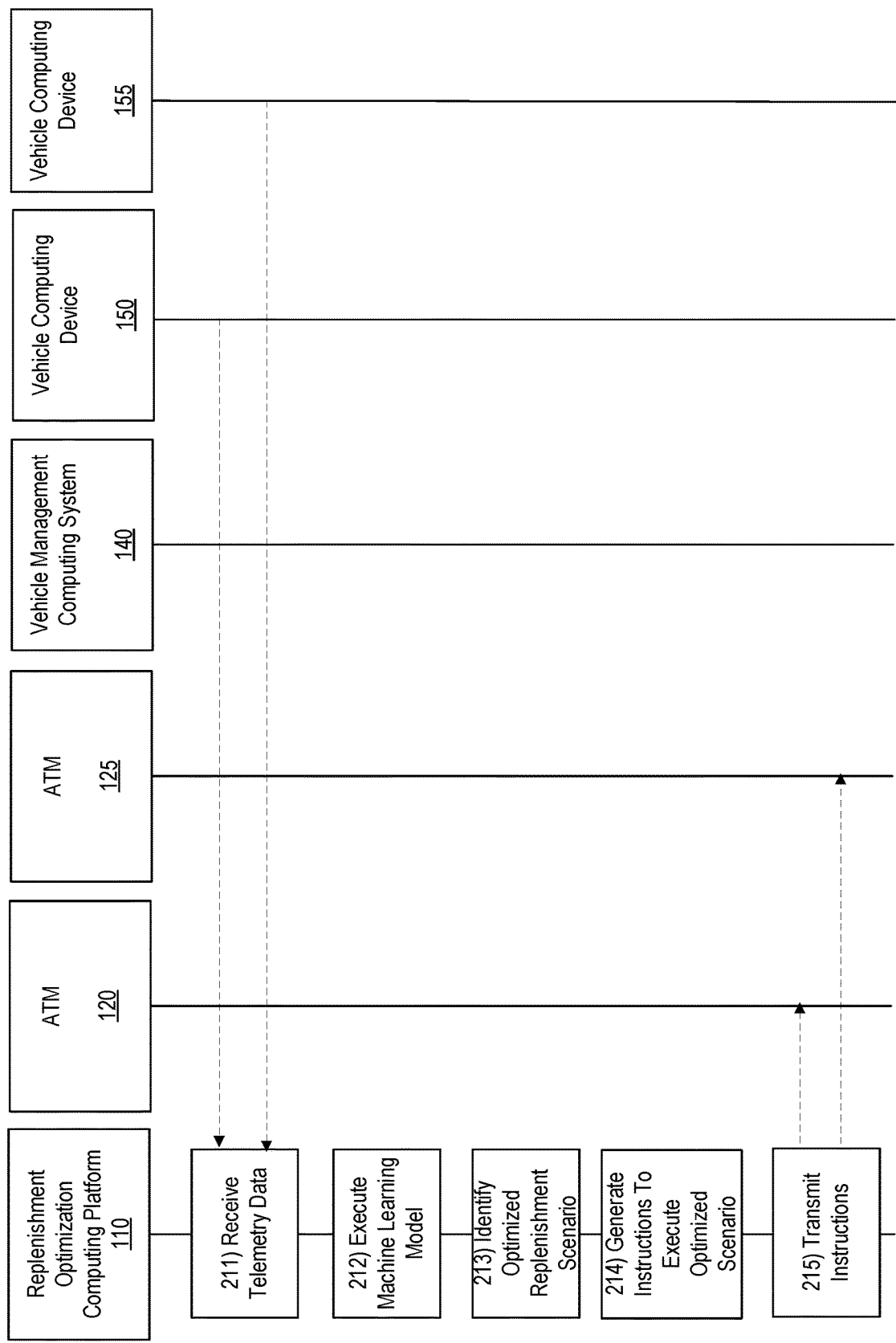

With reference to FIG. 2C, at step 211, replenishment optimization computing platform 110 may receive telemetry data from vehicle computing device 150 (which may be associated with and/or on-board a first vehicle) and/or vehicle computing device 155 (which may be associated with and/or on-board a second vehicle). For instance, current geo-location data (e.g., based on GPS data from respective computing devices), current speed data, and the like, for a vehicle associated with vehicle computing device 150 and/or a vehicle associated with vehicle computing device 155 may be received.

At step 212, the trained machine learning model may receive, as inputs, the current ATM status data, the current routing data, and/or the current telemetry data and may be executed to identify an optimized replenishment scenario. In some examples, the optimized replenishment scenario may be a scenario identified from the plurality of replenishment scenarios used to train the machine learning model. In some examples, the optimized replenishment scenario may be selected based on identifying the scenario that minimizes a cash wait time at one or more ATMs (e.g., ATM 120, ATM 125, and the like).

In some examples, quantum processing may be used to execute the machine learning model. For instance, photonic quantum computing may be used to execute the machine learning model in order to efficiently process the vast amounts of data being processed in real-time or near real-time to provide accurate results. For instance, the inputs may be parameterized and converted to mathematical terms that may be used in the quantum execution of the machine learning model. In some examples, a quantum algorithm may be selected to process the inputs. For instance, quantum algorithms such as Quantum Approximate Optimization Algorithm (QAOA) or Variational Quantum Eigensolver (VQE) may be selected or used in processing the data. In some examples, the selected quantum algorithm may be implemented using a quantum programming framework. In some arrangements, noise mitigation may be used to improve the accuracy of results.

At step 213, based on the output of the machine learning model, an optimized replenishment scenario may be identified.

At step 214, based on the identified optimized replenishment scenario, replenishment optimization computing platform 110 may generate one or more instructions or commands causing execution of the optimized replenishment scenario. For instance, instructions that may modify operation of one or more ATMs (e.g., enable or activate cash recycling functions, disable or deactivate cash recycling functions or the like), instructions that may modify a replenishment route of one or more replenishment vehicles associated with vehicle computing device 150 and/or vehicle computing device 155, or the like, may be generated (e.g., instead of, for instance, a route from ATM 1 to ATM 71 to ATM 30, the route may be modified to ATM 71 to ATM 27 to ATM 50. This is merely one example of route modification. Other modified routes may be used without departing from the invention).

At step 215, replenishment optimization computing platform 110 may transmit or send the generated instructions or commands to ATM 120 and/or ATM 125. Although step 215 includes transmitting instructions to both ATM 120 and ATM 125, in some examples, instructions may be transmitted to one of ATM 120 or ATM 125.

Figure 2D:
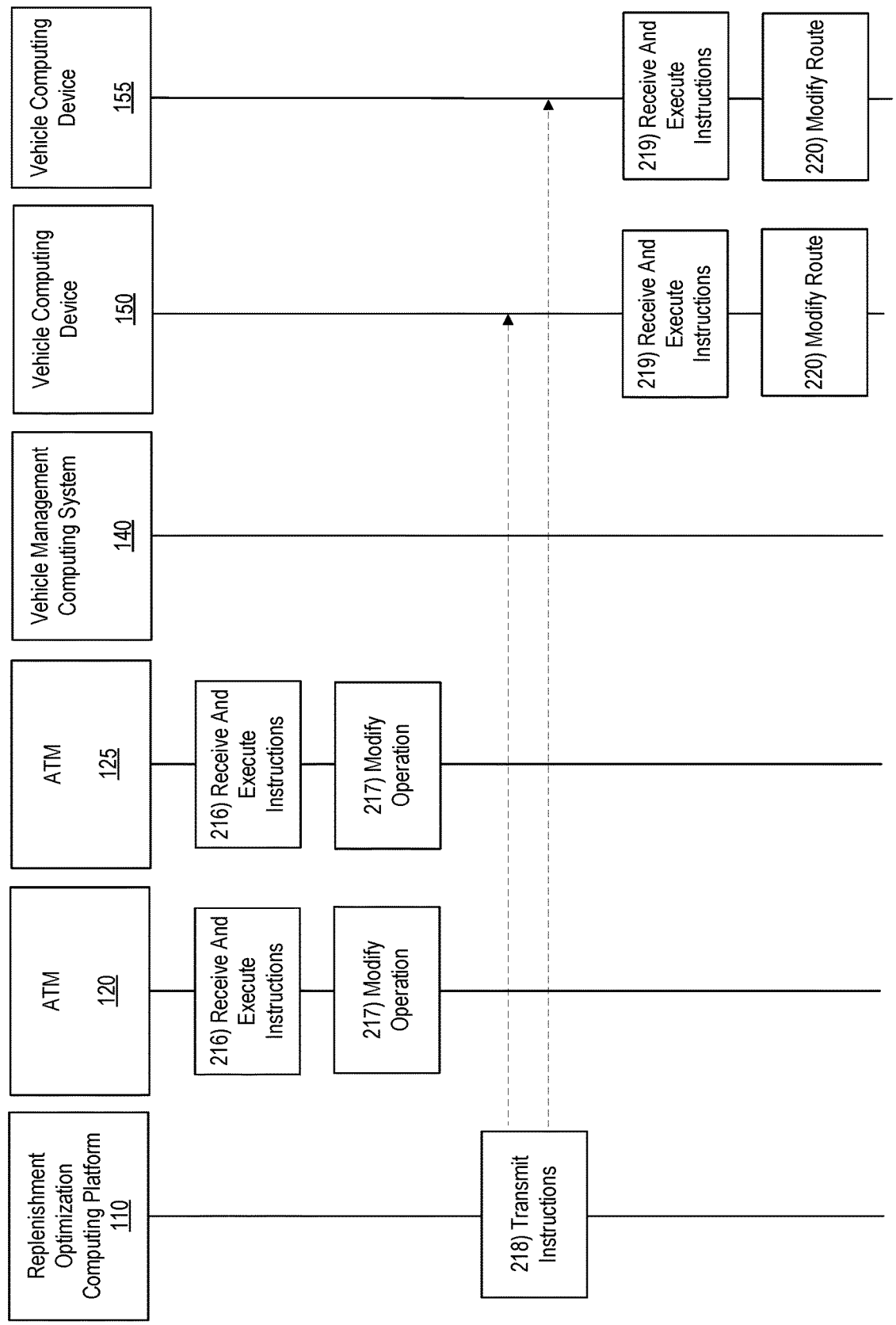

With reference to FIG. 2D, at step 216, ATM 120 and/or ATM 125 may receive and execute the instructions generated and transmitted by the replenishment optimization computing platform 110. At step 217, ATM 120 and/or ATM 125 may modify functionality based on execution of the instructions. For instance, one or more of ATM 120 and/or ATM 125 may activate or enable cash recycling functions (e.g., enabling cash received via deposits to be transferred to a storage location associated with funds available for withdrawals and dispensed to satisfy withdrawal requests), may deactivate or disable cash recycling functions (e.g., store funds received via deposits in a storage location for deposits only and not currently for use in satisfying withdrawal requests), or the like. In some examples, a frequency of cash transfer when cash recycling is enabled may be provided in the instructions to ensure cash availability from a respective ATM.

At step 218, replenishment optimization computing platform 110 may transmit or send the generated instructions or commands to vehicle computing device 150 and/or vehicle computing device 155. Although step 218 includes transmitting instructions to both vehicle computing device 150 and vehicle computing device 155, in some examples, instructions may be transmitted to one of vehicle computing device 150 or vehicle computing device 155.

At step 219, vehicle computing device 150 and/or vehicle computing device 155 may receive and execute the instructions generated and transmitted by the replenishment optimization computing platform 110. At step 220, vehicle computing device 150 and/or vehicle computing device 155 may modify a current replenishment route based on execution of the instructions. For instance, one or more of vehicle computing device 150 and/or vehicle computing device 155 may modify a current replenishment route based on instructions modifying the route received from replenishment optimization computing platform 110. In some examples, vehicle computing device 150 and/or vehicle computing device 155 may receive a replacement route based on the optimized replenishment scenario that replaces replacing an initial route current being executed by vehicle computing device 150 and/or vehicle computing device 155.

Figure 2E:
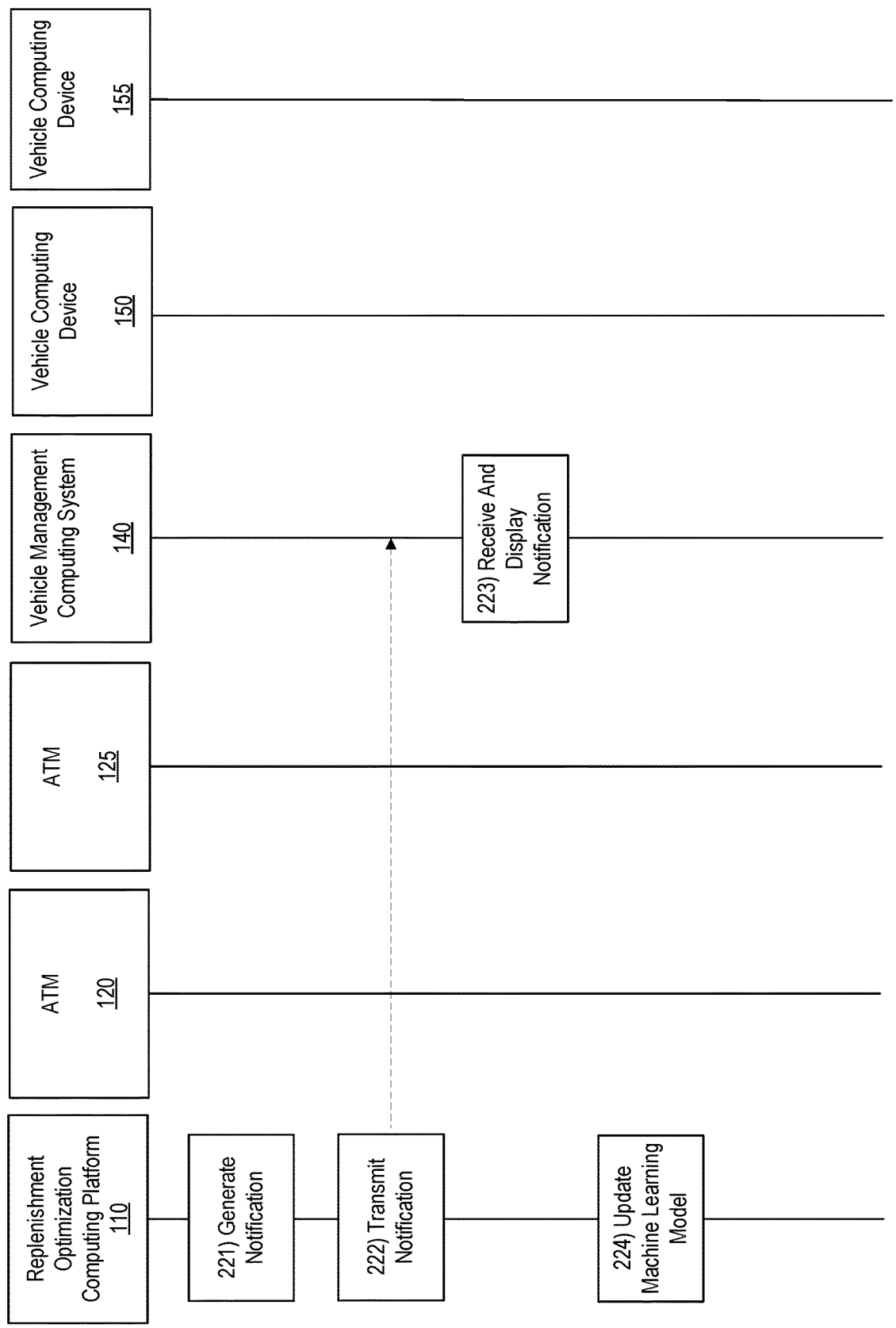

With reference to FIG. 2E, at step 221, replenishment optimization computing platform 110 may generate a notification. For instance, replenishment optimization computing platform may generate a notification indicating modification of functionality at one or more ATMs, modification of a route of one or more replenishment vehicles, and the like. FIG. 4 illustrates one example notification 400 that may be generated. The notification 400 includes an indication that routes have been modified for one or more vehicles, identifies the vehicles having modified routes, and provides a selectable link to review the modified routes.

At step 222, replenishment optimization computing platform 110 may transmit or send the notification to, for instance, vehicle management computing system 140. In some examples, transmitting or sending the notification to vehicle management computing system 140 may cause the vehicle management computing system 140 to display the notification on a display of vehicle management computing system.

At step 223, vehicle management computing system 140 may receive the notification and display the notification.

At step 224, replenishment optimization computing platform 110 may update and/or validate the machine learning engine. For instance, the machine learning model may be updated and/or validated using a dynamic feedback loop based on the identified optimized replenishment scenario, updated status information, modified route information, and the like. Accordingly, the machine learning model may be continuously updated to improve accuracy of outputs.

In some instances, replenishment optimization computing platform 110 may continuously update, validate, refine, or the like, the machine learning model. In some examples, the replenishment optimization computing platform 110 may maintain an accuracy threshold for the machine learning model and may pause refinement (through the dynamic feedback loop) of the model if the corresponding accuracy is identified as greater than the accuracy threshold. Further, if the accuracy is at or below the accuracy threshold, the replenishment optimization computing platform 110 may resume refinement of the model through the corresponding dynamic feedback loop.

In order to ensure real-time optimization, the process may then continue to receive updated ATM status information, telemetry data, and the like, which may be analyzed, using the machine learning model, to generate a subsequent optimized replenishment scenario. Depending on the subsequent optimized replenishment scenario, instructions may be generated and transmitted to further modify functionality of one or more ATMs, further modify replenishment routes of one or more vehicles, and the like. Accordingly, the system may continuously or near continuously evaluate ATM and vehicle status to ensure optimized replenishment is being executed. In some examples, the optimized replenishment processes may be executed during a predefined time period (e.g., during business hours, between 10 a.m. and 2 p.m., 24 hours/day, or the like).

Figure 3:
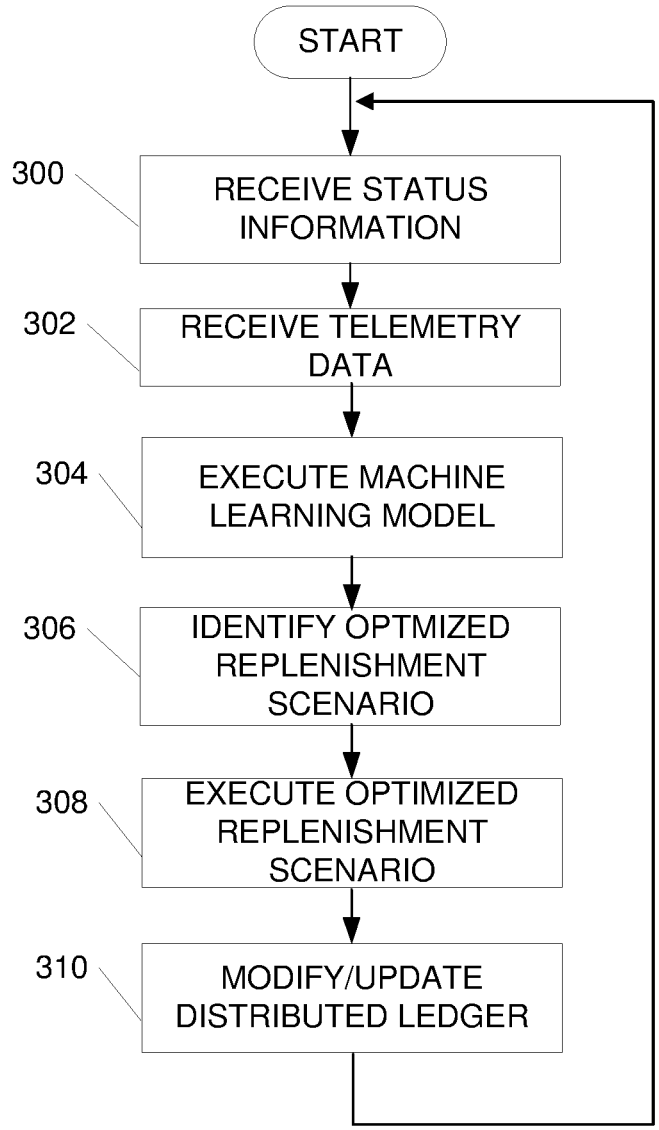
FIG. 3 depicts an illustrative method for leveraging quantum computing to optimize cash recycling functions at ATMs in accordance with one or more aspects described herein.

FIG. 3 is a flow chart illustrating one example method of leveraging quantum computing to optimize cash recycling in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a computing platform, such as replenishment optimization computing platform 110, may receive, from a plurality of ATMs, current status information. For instance, real-time information related to geo-location of each ATM (which may be static data), current depletion rate of funds at each ATM, current cash status of each ATM, and the like, may be received.

At step 302, the computing platform may receive telemetry data from computing devices associated with a plurality of cash replenishment vehicles. For instance, current geo-location data from GPS systems associated with computing devices in each vehicle, as well as speed of the vehicle, and the like, may be received by the computing platform.

At step 304, the computing platform may execute a machine learning model. In some examples, executing the machine learning model may include using, as inputs, the received current status information and the telemetry data to output an optimized replenishment scenario for the plurality of ATMs. In some examples, executing the machine learning model may include executing a photonic quantum computing process to output or identify the optimized replenishment scenario. In some examples, the machine learning model may further use, as inputs, an initial replenishment route of the one or more cash replenishment vehicles.

At step 306, the optimized replenishment scenario may be identified based on the output of the machine learning model. In some examples, the identified optimized replenishment scenario may include a scenario that minimizes cash unavailability at the plurality of ATMs.

At step 308, the optimized replenishment scenario may be executed. For instance, the computing platform may generate one or more commands or instructions causing one or more ATMs of the plurality of ATMs to initiate cash recycling functionality, deactivate cash recycling functionality, modify or maintain cash recycling functionality, or the like, to minimize risk of cash unavailability. The generated one or more commands or instructions may be transmitted to the plurality of ATMs which may cause each ATM to executing the instructions and modify the operation of a respective ATM. In some examples, activating or initiating the cash recycling functionality may include enabling a respective ATM to transfer funds received via a deposit to a storage location of the ATM configured to dispense funds for a withdrawal.

In some examples, executing the optimized replenishment scenario may further include generating one or more instructions or commands causing at least one cash replenishment vehicle to modify a replenishment route. The generated one or more commands may be transmitted to a computing device associated with at least one cash replenishment vehicle and may be executed, causing the at least one cash replenishment vehicle to execute the modified replenishment route.

At step 310, a distributed ledger may be updated and/or modified to include events executed in response to execution of the optimized replenishment scenario. For instance, transfers of funds from cash storage to cash recycling may be recorded in the distributed ledger (e.g., one or more additional blocks may be added including ATMs impacted, amount of funds, time of transfer, or the like). Additionally or alternatively, modifications to a replenishment route of one or more cash replenishment vehicles may be recorded in the distributed ledger. In some examples, distributed hash technology may be used. The distributed ledger enables immutable traceability for modifications related to cash at the various ATMs and cash replenishment vehicles. This audit trail may enable real-time understanding of cash position of each ATM, each cash replenishment vehicles, each vehicle management entity and/or each financial institution associated with the process.

The process may then continue to receive updated or subsequent current ATM status data, telemetry data, and the like, and the process may continue to ensure optimized replenishment is executed continuously or near continuously.

Accordingly, aspects described herein leverage quantum computing to evaluate real-time data to identify an optimized scenario for replenishing a plurality of ATMs using both cash recycling functionality at the ATM and conventional replenishment (e.g., delivery of cash by cash replenishment vehicles). The use of quantum computing enables the system to process vast amounts of data related to hundreds or even thousands of ATMs in real-time to identify and execute a synchronized replenishment scenario that includes modifying operation of an ATM to enable or disable cash recycling, controlling replenishment routes of cash replenishment vehicles, and the like.

As discussed herein, aspects described leverage quantum computing to analyze vast amounts of data to identify an optimized replenishment plan or scenario. For instance, some enterprise organizations may have or be associated with hundreds or thousands of ATMs. Data from those ATMs may be received and analyzed. For instance, location information, as well as a rate of depletion for each ATM (which may, e.g., depend on location) may be received and analyzed in real-time or near real-time. In addition, real-time or current telemetry data including speed and location from hundreds or even thousands or cash replenishment vehicles may be received and analyzed in real-time or near real-time (and in conjunction with the ATM data) to identify a real-time optimized replenishment scenario. In some examples, public information such as traffic data, or the like, may also be received and analyzed to identify the optimized replenishment scenario. Classical computing techniques might not be capable of processing, in real-time or near real-time, such vast amounts of data.

Although aspects described herein are provided in relation to a plurality of ATMs, in some examples, optimized replenishment analysis may be performed for a single ATM (e.g., because each ATM may have different cash situations, depletion rates, or the like). For instance, an ATM located in a shopping center may have unique depletion rates vs. an ATM located at a financial center. Accordingly, in some examples, a single ATM may be analyzed to identify optimized replenishment for that particular ATM.

In arrangements in which a group, cluster or plurality of ATMs are being optimized, in some examples, a local network may be generated for the group, cluster or plurality of ATMs. For instance, status data may be captured and transferred to a central system (e.g., computing platform 110) for analysis. However, should a network disruption occur, the loss of data from the one or more ATMs may negatively impact the optimization scenario in place, as well as further optimization analysis (e.g., because of a gap in data which may lead to inaccurate or not current information being used in analysis). Accordingly, a local network may be established to capture the ATM data and transfer the data to the central system. The local network may store the data for use in case of network disruption.

As discussed herein, quantum computing may be used to analyze data to identify an optimized replenishment scenario. In some examples, the process may be run on quantum hardware and the output may be measured. The measured output may then be transferred back to a classical computing system to orchestrate execution of the optimized replenishment plan (e.g., generating instructions or commands, transmitting instructions or commands to ATMs and vehicles, and the like).

In some examples, denominations of cash in each ATM may also be used to identify the optimized replenishment plan. For instance, ATMs may provide a count of different denominations of bills in the machine with the current status information. Accordingly, the optimized replenishment scenario may then consider a number of each denomination, a likely need of one or more denominations, and the like, when analyzing the data to output the optimized replenishment scenario.

Accordingly, as discussed herein, aspects described provide a technical optimization procedure to orchestrate automatic teller machine (ATM) cash re-cycling using photonic quantum computing. In some examples, the computing platform may orchestrate cash recycling functions of one or more ATMs by reusing deposit cash available on an ATM machine. The orchestration may be based on ATM case depletion rate, cash replenishment vehicle GPS geo-location telemetry which, in some examples, may include speed and time to reach one or more ATMs for replenishment.

As discussed, aspects included leveraging distributed hash technology to orchestrate cash flow in sync with quantum optimization of cash recycling. Cash reconciliation may be managed via the distributed ledger to ensure traceability. In some examples, the arrangements may also provide for pre-staging of cash management for planning or routing activities based on real-time or near real-time data from ATMs, vehicles, and the like.

Figure 5:
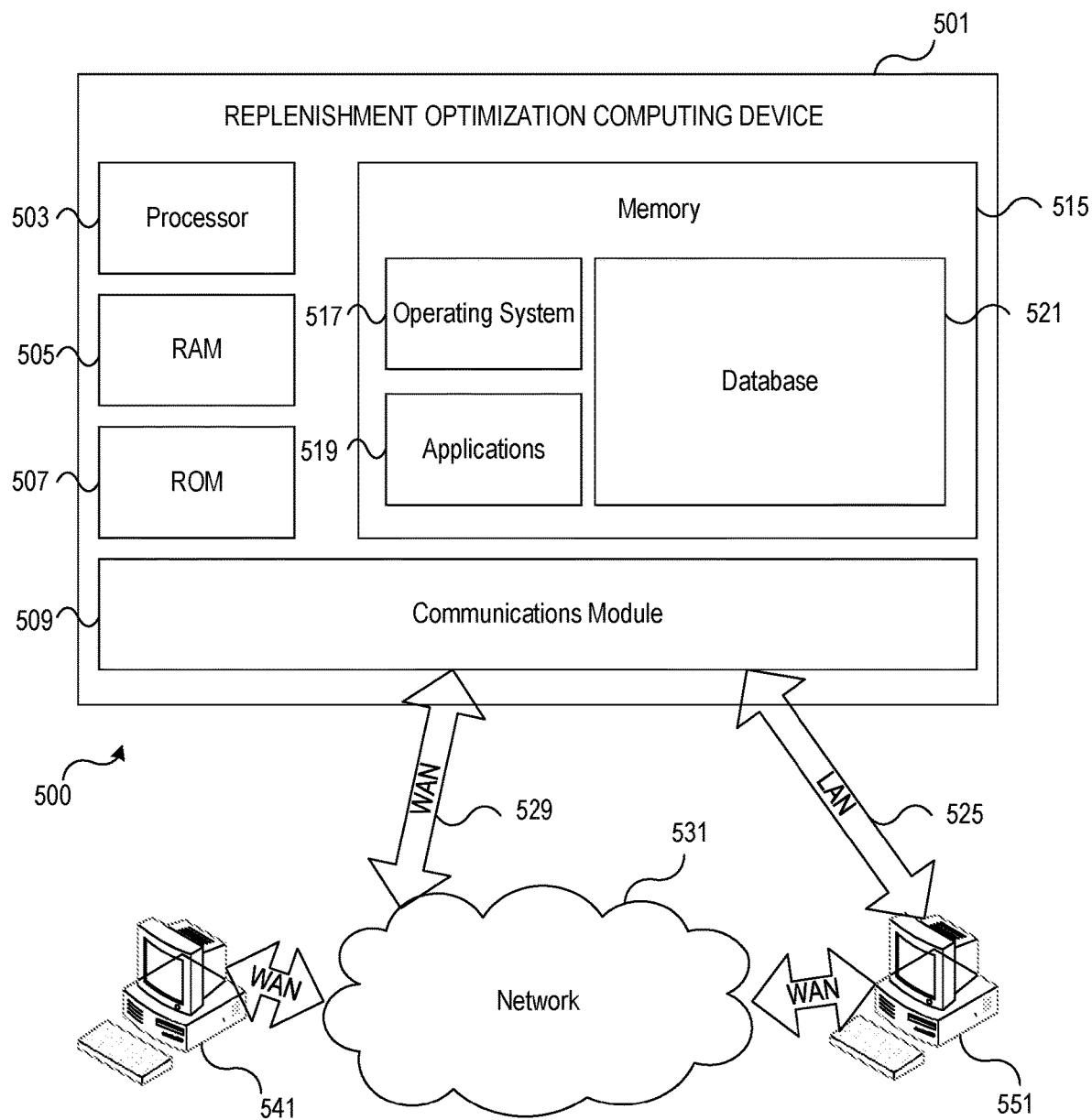
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include replenishment optimization computing device 501 having processor 503 for controlling overall operation of replenishment optimization computing device 501 and its associated components, including Random Access Memory (RAM) 505, Read-Only Memory (ROM) 507, communications module 509, and memory 515. Replenishment optimization computing device 501 may include a variety of computer readable media. Computer readable media may be any available media that may be accessed by replenishment optimization computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by replenishment optimization computing device 501.

Although not required, various aspects described herein may be embodied as a method, a data transfer system, or as a computer-readable medium storing computer-executable instructions. For example, a computer-readable medium storing instructions to cause a hardware processor to perform steps of a method in accordance with aspects of the disclosed embodiments is contemplated. For example, aspects of method steps disclosed herein may be executed on a processor on replenishment optimization computing device 501. Such a processor may execute computer-executable instructions stored on a computer-readable medium.

Software may be stored within memory 515 and/or storage to provide instructions to processor 503 for enabling replenishment optimization computing device 501 to perform various functions as discussed herein. For example, memory 515 may store software used by replenishment optimization computing device 501, such as operating system 517, application programs 519, and associated database 521. Also, some or all of the computer executable instructions for replenishment optimization computing device 501 may be embodied in hardware or firmware. Although not shown, RAM 505 may include one or more applications representing the application data stored in RAM 505 while replenishment optimization computing device 501 is on and corresponding software applications (e.g., software tasks) are running on replenishment optimization computing device 501.

Communications module 509 may include a microphone, keypad, touch screen, and/or stylus through which a user of replenishment optimization computing device 501 may provide input, and may also include one or more of a speaker for providing audio output and a video display device for providing textual, audiovisual and/or graphical output. Computing system environment 500 may also include optical scanners (not shown).

Replenishment optimization computing device 501 may operate in a networked environment supporting connections to one or more other computing devices, such as computing device 541 and 551. Computing devices 541 and 551 may be personal computing devices or servers that include any or all of the elements described above relative to replenishment optimization computing device 501.

The network connections depicted in FIG. 5 may include Local Area Network (LAN) 525 and Wide Area Network (WAN) 529, as well as other networks. When used in a LAN networking environment, replenishment optimization computing device 501 may be connected to LAN 525 through a network interface or adapter in communications module 509. When used in a WAN networking environment, replenishment optimization computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
  at least one processor;
  a communication interface communicatively coupled to the at least one processor; and
  a memory storing computer-readable instructions that, when executed by the at least one processor, cause the computing platform to:
    receive, from a plurality of automated teller machines (ATMs), current status information associated with each ATM of the plurality of ATMs;
    receive, from computing devices associated with one or more cash replenishment vehicles, telemetry data including speed of each cash replenishment vehicle of the one or more cash replenishment vehicles and geo-location data from a global positioning system (GPS) associated with each cash replenishment vehicle of the one or more cash replenishment vehicles;
    execute a machine learning model, wherein executing the machine learning model includes using, as inputs, the received current status information and the telemetry data, identifying and outputting an optimized replenishment scenario that minimizes cash unavailability at the plurality of ATMs, and wherein executing the machine learning model includes executing a photonic quantum computing process to identify the optimized replenishment scenario;
    execute the optimized replenishment scenario, wherein executing the optimized replenishment scenario includes:
      generating one or more instructions causing the plurality of ATMs to modify operation to:
        activate or deactivate cash recycling functions; and
        transmitting, to the plurality of ATMs, the generated one or more instructions, wherein transmitting the generated one or more instructions causes each ATM of the plurality of ATMs to execute the one or more instructions and modify operation of a respective ATM;
      generating one or more instructions causing at least one cash replenishment vehicle of the one or more cash replenishment vehicles to modify a replenishment route; and
      transmitting, to a computing device associated with the at least one cash replenishment vehicle, the one or more instructions to modify a replenishment route, wherein transmitting the one or more instructions to modify the replenishment route causes the at least one cash replenishment vehicle to execute the modified replenishment route.

2. The computing platform of claim 1, wherein the current status information of each ATM of the plurality of ATMs includes a geo-location of each ATM of the plurality of ATMs, a current cash status of each ATM of the plurality of ATMs, and a depletion rate of each ATM of the plurality of ATMs.

3. The computing platform of claim 1, wherein activating cash recycling functions includes enabling the respective ATM to transfer funds received via a deposit to a storage location of the ATM configured to dispense funds for a withdrawal.

4. The computing platform of claim 1, wherein executing the machine learning model further includes using, as inputs, an initial replenishment route for the one or more cash replenishment vehicles.

5. A method, comprising:
  receiving, by a computing platform, the computing platform having at least one processor and memory, and from a plurality of automated teller machines (ATMs), current status information associated with each ATM of the plurality of ATMs;
  receiving, by the at least one processor and from computing devices associated with one or more cash replenishment vehicles, telemetry data including speed of each cash replenishment vehicle of the one or more cash replenishment vehicles and geo-location data from a global positioning system (GPS) associated with each cash replenishment vehicle of the one or more cash replenishment vehicles;
  executing, by the at least one processor, a machine learning model, wherein executing the machine learning model includes using, as inputs, the received current status information and the telemetry data, identifying and outputting an optimized replenishment scenario that minimizes cash unavailability at the plurality of ATMs, and wherein executing the machine learning model includes executing a photonic quantum computing process to identify the optimized replenishment scenario;
  executing, by the at least one processor, the optimized replenishment scenario, wherein executing the optimized replenishment scenario includes:
    generating, by the at least one processor, one or more instructions causing the plurality of ATMs to modify operation to:
      activate or deactivate cash recycling functions; and
      transmitting, by the at least one processor and to the plurality of ATMs, the generated one or more instructions, wherein transmitting the generated one or more instructions causes each ATM of the plurality of ATMs to execute the one or more instructions and modify operation of a respective ATM;
    generating one or more instructions causing at least one cash replenishment vehicle of the one or more cash replenishment vehicles to modify a replenishment route; and
    transmitting, to a computing device associated with the at least one cash replenishment vehicle, the one or more instructions to modify a replenishment route, wherein transmitting the one or more instructions to modify the replenishment route causes the at least one cash replenishment vehicle to execute the modified replenishment route.

6. The method of claim 5, wherein the current status of each ATM of the plurality of ATMs includes a geo-location of each ATM of the plurality of ATMs, a current cash status of each ATM of the plurality of ATMs, and a depletion rate of each ATM of the plurality of ATMs.

7. The method of claim 5, wherein activating cash recycling functions includes enabling the respective ATM to transfer funds received via a deposit to a storage location of the ATM configured to dispense funds for a withdrawal.

8. The method of claim 5, wherein executing the machine learning model further includes using, as inputs, an initial replenishment route for the one or more cash replenishment vehicles.

9. One or more non-transitory computer-readable media storing instructions that, when executed by a computing platform comprising at least one processor, memory, and a communication interface, cause the computing platform to:
  receive, from a plurality of automated teller machines (ATMs), current status information associated with each ATM of the plurality of ATMs;
  receive, from computing devices associated with one or more cash replenishment vehicles, telemetry data including speed of each cash replenishment vehicle of the one or more cash replenishment vehicles and geo-location data from a global positioning system (GPS) associated with each cash replenishment vehicle of the one or more cash replenishment vehicles;
  execute a machine learning model, wherein executing the machine learning model includes using, as inputs, the received current status information and the telemetry data, identifying and outputting an optimized replenishment scenario that minimizes cash unavailability at the plurality of ATMs, and wherein executing the machine learning model includes executing a photonic quantum computing process to identify the optimized replenishment scenario;
  execute the optimized replenishment scenario, wherein executing the optimized replenishment scenario includes:
    generating one or more instructions causing the plurality of ATMs to modify operation to:
    activate or deactivate cash recycling functions; and
    transmitting, to the plurality of ATMs, the generated one or more instructions, wherein transmitting the generated one or more instructions causes each ATM of the plurality of ATMs to execute the one or more instructions and modify operation of a respective ATM;
    generating one or more instructions causing at least one cash replenishment vehicle of the one or more cash replenishment vehicles to modify a replenishment route; and
    transmitting, to a computing device associated with the at least one cash replenishment vehicle, the one or more instructions to modify a replenishment route, wherein transmitting the one or more instructions to modify the replenishment route causes the at least one cash replenishment vehicle to execute the modified replenishment route.

10. The one or more non-transitory computer-readable media of claim 9, wherein the current status of each ATM of the plurality of ATMs includes a geo-location of each ATM of the plurality of ATMs, a current cash status of each ATM of the plurality of ATMs, and a depletion rate of each ATM of the plurality of ATMs.

11. The one or more non-transitory computer-readable media of claim 9, wherein activating cash recycling functions includes enabling the respective ATM to transfer funds received via a deposit to a storage location of the ATM configured to dispense funds for a withdrawal.

* * * * *